Aug. 17, 1943.  J. B. PETERSON  2,326,797
MERCURIAL BAROMETER
Original Filed April 30, 1928
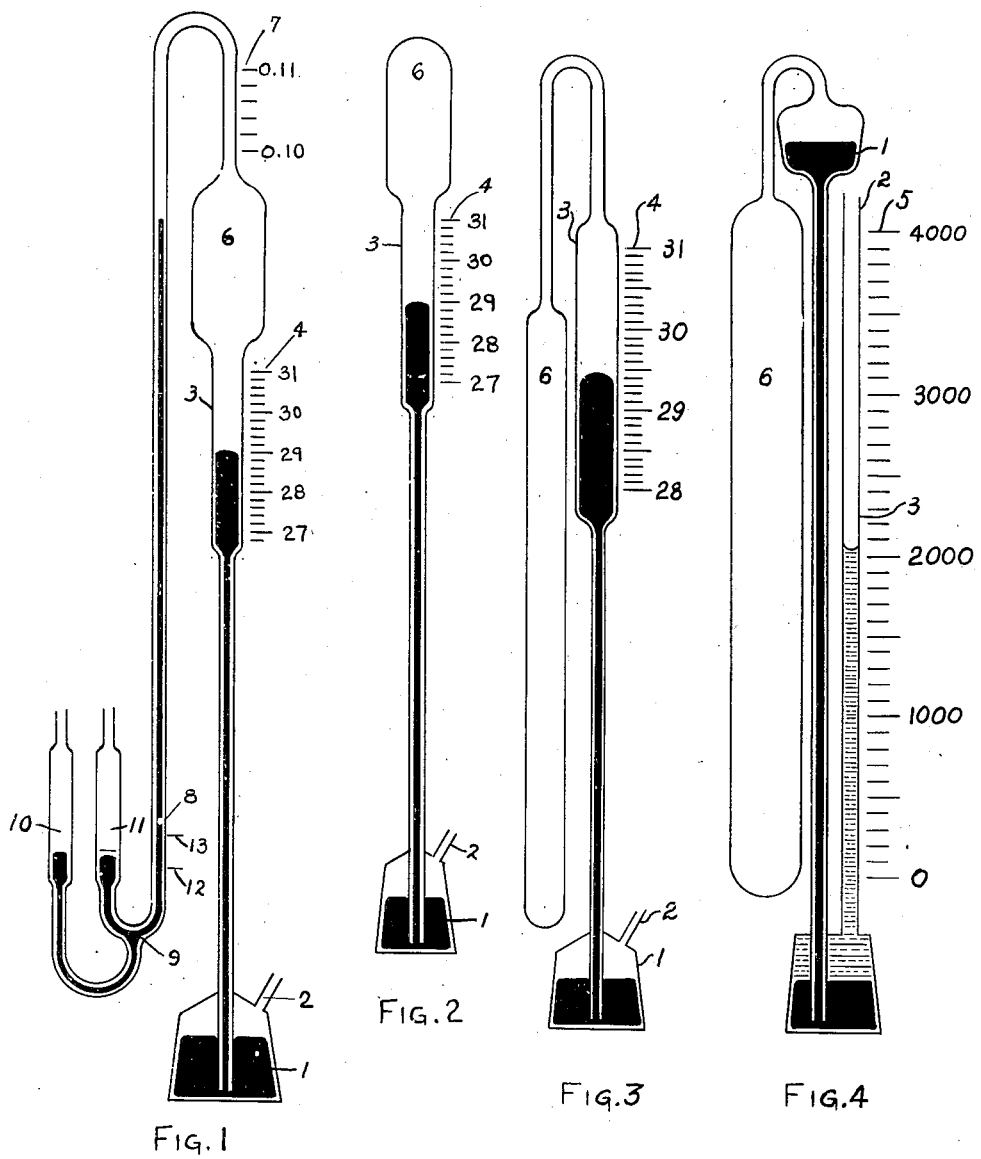
Inventor
JOHN B. PETERSON
W Glenn Jones
Attorney Patented Aug. 17, 1943

2,326,797

UNITED STATES PATENT OFFICE 2,326,797

MERCURIAL BAROMETER

John B. Peterson, Bethesda, Md.

Application August 23, 1940, Serial No. 353,874

1 Claim. (Cl. 73—4)

(Granted under the act of March 3, 1883, as amended April 30, 1928; 370 O. G. 757)

This invention relates to improvements in mercurial barometers, and more particularly to the temperature compensation of mercurial barometers.

An object of the invention is to provide means for freeing mercurial barometers of temperature errors and for improving their reliability, especially under varying temperature conditions.

It has been found that if the volume of the space above the mercury in the tube of a mercurial barometer and the gas pressure in this space are properly proportioned, the temperature error of the instrument can be reduced to practically zero.

One object of this invention is to provide an accurate instrument which will indicate the altimeter setting pressure directly, without the necessity of applying corrections. It is believed that an instrument of this kind will be a time saver, and will materially reduce the errors in altimeter setting pressures.

It has long been known to the art that aneroid barometers may be compensated for temperature by leaving some residual gas in the vacuum box, and that mercury barometers may be compensated for temperature by leaving some residual gas in the top of the tube above the mercury. However, this compensation until now has been imperfect in that it was effective at only one preferred pressure. The object of this invention is to make available a mercury barometer which is perfectly compensated over wide ranges of pressure and temperature. This compensation is accomplished by properly proportioning the volume of the space above the mercury in the tube and the gas pressure in this space, and by tapering the mercury cistern.

With the foregoing and other objects in view, the invention consists in the construction, combination and arrangement of parts hereinafter described and illustrated in the drawing, in which:

Fig. 1 shows an instrument with gas compensation for temperature variations and with means for measuring and adjusting the pressure of the compensating gas;

Fig. 2 shows a simpler form of the instrument wherein the cisterns of these instruments are tapered so as to make a uniformly spaced pressure scale;

Fig. 3 shows an instrument in which the compensating chamber is placed adjacent to the mercury column so as to assure that they will be at the same temperature; and Fig. 4 shows a two liquid instrument having an elongated scale which can be read accurately without the use of a vernier.

In all of these figures, 1 is the cistern, 2 is a nipple connection to the pressure which is to be measured, 3 is the tube, 4 is a pressure scale, 5 is an altitude scale and 6 is the compensating chamber.

The requirement for temperature compensation may be expressed in the form of equations. For temperature compensation by this method it is necessary that the following equations be satisfied at some point near the center of the instrument scale:

$$p = \frac{dP}{dT}T = \frac{\left(P+\frac{M}{A}\right)(m-n)T}{1+(m-n)T} \quad (1)$$

$$V = \left(P+\frac{M}{A}\right)\frac{dV}{d\left(P+\frac{M}{A}\right)} \quad (2)$$

where $p =$ the compensating pressure.

$P =$ the pressure indication of the barometer.
$T =$ the absolute temperature.
$M =$ the total volume of mercury in the barometer.
$A =$ the net horizontal area of the cistern.
$m =$ the volumetric coefficient of expansion of mercury at the temperature T.
$n =$ the linear coefficient of expansion of the scale, cistern material and the glass in the tube. To avoid complications these coefficients have been assumed to be equal.
$V =$ the volume of the compensating space.
$\frac{dP}{dT} =$ the rate of change of pressure indication with temperature for the uncompensated barometric.
$\frac{dV}{d(P+M)} =$ the rate of change of the compensating volume with change in $\left(P+\frac{M}{A}\right)$.

The compensating pressure for a barometer to measure atmospheric pressure of approximately 30 inches of mercury is of the order of 1.5 inches of mercury. In this specification, pressures are given the dimension of length; i. e., inches or millimeters (of mercury). Any unit of length may be used, provided it is consistently used throughout in measuring pressures, areas and volumes. The volume of the compensating chamber is equal approximately to the inside area of the tube in the reading section multiplied by the pressure P.

If the values of $p$ and $V$ are adjusted so as to satisfy these equations at the middle point of the pressure scale, the values of $p$ for other readings on the pressure scale will be only approximately proportional to $$P + \frac{M}{A}$$

which would be the condition for perfect compensation. The consequences of this discrepancy are (1) a non-uniform pressure scale and (2) imperfect temperature compensation. The pressure scale may be made uniform by the use of a tapered cistern or a tapered tube. However, a tapered tube will not be found sufficiently satisfactory because of capillarity. Capillarity causes an error, and due to the varying diameter of a tapered tube, it would be impossible to compensate for the consequent varying capillarity errors. The imperfection in the temperature compensation can be shown to cause only negligible errors. The maximum theoretical error of a barometer having a range of 24 to 32 inches of mercury, caused by temperature variations from 5 to 35° C., will not exceed 0.001 inch of mercury.

The possibility of providing means for measuring the compensating pressure and adjusting it to the proper value has been considered and these means are incorporated in the instrument shown in Fig. 1. The compensating volume, compensating pressure and cistern taper are calculated for this instrument, by the method which has already been described. After the manufacturer has placed the various reference marks in their proper locations, this instrument can be shipped empty and filled with mercury at its destination. Or if the mercury gets dirty, the instrument can be emptied for cleaning, refilled and adjusted for proper operation, without reference to other standards.

To do this, the proper amount of mercury is poured into the cistern, and a P/T factor is calculated by dividing the existing atmospheric pressure by the room temperature (absolute temperature). If the atmospheric pressure is expressed in inches of mercury and the absolute temperature is in degrees centigrade, scale 7 will have the range shown in Fig. 1. At atmospheric pressure and room temperature the volume of compensating gas is $$v = V_M \frac{P_M}{T_M} \frac{T}{P} \quad (3)$$

$v$ = the volume of the compensating gas at room temperature $T$, and room pressure $P$.

$V_M$ = the volume of the compensating gas at standard values of pressure and temperature $P_M$ and $T_M$.

Scale 7 is placed so that the volume of tube 8 from junction 9 to the P/T factor satisfies this equation for any values of atmospheric pressure and room temperature.

After tube 8 has been opened to the atmosphere by application of suction to tube 10, the mercury in the main tube is set to the calculated P/T factor on scale 7. Now if the suction of tube 10 is released gradually, allowing the mercury to rise in tubes 8 and 11, the proper amount of compensating gas will be trapped. The pressure at 2 is then released and the mercury in the main tube falls to the proper reading on scale 4.

These instructions presume that the atmospheric pressure is known approximately before the barometer has been put into operation. If this pressure cannot be obtained, even approximately, $P_M$ (29 inches of mercury) may be used to calculate the P/T factor. An error in this assumed pressure will cause approximately 1/20 of that error in the barometer indication. If necessary the adjustment should be repeated each time with a more accurate P/T factor until the residual error has been reduced to a satisfactory value.

If desired, an inert gas or a gas with a higher heat conductivity than air may be introduced into the compensating chamber. In any event there should be no water vapor in the compensating gas. The presence of water vapor can be avoided by performing the filling operations at an elevated temperature and by the use of drying agents.

If it is desired to check the compensating pressure without opening the compensation chamber to the atmosphere and risking the introduction of moisture vapor, this may be done. The P/T factor is calculated and pressure is applied at 2 to bring the mercury in the main column to this P/T factor. The mercury in tube 8 will now have fallen to the vicinity of reference limits 12 and 13. The air pressure in tube 10 is adjusted to bring the mercury in tube 11 to the reference mark thereon. Now the pressure in the tube 8 is slightly greater than atmospheric pressure and the reference marks 12 and 13 have been so placed that if the mercury in tube 8 stands between them, the error in pressure indication will not exceed, say plus or minus 0.002 inch.

The compensating chambers of the instruments shown in Figs. 3 and 4 are placed in proximity to the mercury column, so that if there is a temperature gradient around the barometer, the compensation will still be effective. For proper compensation when the temperature is varying, the compensating chamber and the mercury column should be adjusted so as to have the same temperature lag. The accuracy of the instrument may also be improved by insulating the compensating chamber and the mercury column in the same envelope.

It has become the practice of the weather bureau and the air transport companies to furnish airplanes periodically with an altimeter setting pressure in inches of mercury, for use in setting the airplane altimeter. When preparatory to landing, the pressure scale of the sensitive altimeter is set to this figure, it will upon landing indicate the altitude of the field above sea level, provided there are no errors in the furnished altimeter setting pressure or in the altimeter. In making a blind landing the pilot relies on the altimeter, used in this method to determine his altitude above the landing field until contact with the landing beam is made.

The altimeter setting is determined by reading a mercury barometer, making various corrections to determine the true barometric pressure and finally taking the altimeter setting corresponding to the barometric pressure from a table constructed especially for the airport at which it is to be used.

A preferred form of temperature compensated liquid barometer for use as an altimeter setting instrument is shown schematically in Fig. 3. Temperature compensation is provided by gas in the compensation chamber 6, connected to the space above the mercury. To provide a uniform altimeter setting scale 4, the cistern 1 is tapered.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention what is claimed is:

A liquid barometer comprising a tapered cistern, a tube, liquid in said cistern extending into said tube and spaced from the top thereof, said cistern having an opening therein in communication with the pressure to be measured, said opening being located above the liquid in the cistern; the space above said liquid in said tube providing a temperature compensation chamber the volume of which is approximately equal to the volume corresponding to the height of the liquid column above the meniscus of the cistern multiplied by the horizontal area of the liquid in the reading section of the tube, a compensating gas in said compression chamber, the expansion and contraction of which compensates the instrument against changes in temperature, the taper of said cistern being so proportioned that the meniscus of the liquid column moves equal distances with unit variations in the pressure.

JOHN B. PETERSON.